(12) United States Patent
Shen (10) Patent No.: US 8,082,870 B2
(45) Date of Patent: Dec. 27, 2011

(54) MULTIPLEX-THRUSTER SYSTEMS FOR DELIVERING THRUSTING FLOW

(75) Inventor: Wei-Min Shen, Rancho Palos Verdes, CA (US)

(73) Assignee: University of Southern California, Los Angeles, CA (US)

( * ) Notice: Subject to any disclaimer, the term of this patent is extended or adjusted under 35 U.S.C. 154(b) by 347 days.

(21) Appl. No.: 12/392,941

(22) Filed: Feb. 25, 2009

(65) Prior Publication Data

US 2009/0211511 A1 Aug. 27, 2009

Related U.S. Application Data (60) Provisional application No. 61/031,241, filed on Feb. 25, 2008.

(51) Int. Cl.
*B63G 8/08* (2006.01)
(52) U.S. Cl. .............. 114/337; 114/330; 440/40
(58) Field of Classification Search .......... 114/151, 114/330, 337, 312; 440/40
See application file for complete search history.

(56) References Cited

U.S. PATENT DOCUMENTS

| | | | |
|---|---|---|---|
| 2,467,022 A | 4/1949 | Forlando | |
| 3,122,121 A | 2/1964 | Krauth | |
| 3,492,965 A * | 2/1970 | Wayfield | 114/337 |
| 4,010,619 A * | 3/1977 | Hightower et al. | 405/191 |
| 5,129,846 A | 7/1992 | Dimijian | |
| 5,379,267 A * | 1/1995 | Sparks et al. | 367/18 |
| 5,758,592 A | 6/1998 | Benson, Jr. | |
| 6,363,874 B1 * | 4/2002 | Griffith, Sr. | 114/151 |
| 2003/0214579 A1 | 11/2003 | Iddan | |
| 2003/0214580 A1 | 11/2003 | Iddan | |

FOREIGN PATENT DOCUMENTS

DE 19840078 3/2000

OTHER PUBLICATIONS

Chambers et al., "University of Southern California: SCS BeoSub I" [online] Jan. 1, 2005 (XP007911268). Retrieved from the Internet: http://74.125.77.132/search?q=cache:DOP1IJAVTdUJ:www.ausvi.com/competitions/2005/JournalPapers/USC.pdf+inspired+energy+NI2040HD24&cd=2&hl=en&ct=clnk&gl=de&client=firefox-a> [retrieved on Jan. 22, 2010], 10 pages.

Integrated Thrusters™, TSL Technology Ltd., Hampshire, England, Copyright © 2007 [online]. Retrieved from the Internet: http://www.tsltechnology.com/marine/thrusters.htm [retrieved on Apr. 22, 2010], 3 pages.

International Search Report and Written Opinion from App. Ser. No. PCT/US2009/035158, dated Feb. 8, 2010, 19 pages.

SBT150A Specifications, SeaBotix, San Diego, California, Copyright © 2005, 1 page.

* cited by examiner

*Primary Examiner* — Lars A Olson
(74) *Attorney, Agent, or Firm* — Fish & Richardson P.C.

(57) ABSTRACT

Designs and techniques for fluid thrusters and vehicles that are powered by propelling fluids with fluid thrusters. Multiplex-thruster (MT) systems are disclosed that include a single thruster and a flow multiplexer with multiple channels to deliver thrusting flow in various directions.

13 Claims, 7 Drawing Sheets

MULTIPLEX-THRUSTER SYSTEMS FOR DELIVERING THRUSTING FLOW

CROSS REFERENCE TO RELATED APPLICATIONS

This document claims priority under 35 U.S.C. §119(e) to U.S. Provisional Application Ser. No. 61/031,241, entitled "Multiplex-Thruster Systems for Delivering Thrusting Flow," and filed by Wei-Min Shen on Feb. 25, 2008, the entire disclosure of which is incorporated herein by reference.

TECHNICAL FIELD

This document relates to fluid control and apparatus and techniques for delivering thrusting flow and applications thereof.

BACKGROUND

Autonomous underwater vehicles (AUVs) are valuable tools for many marine applications. These machines can perform operations that may be dangerous, repetitive, difficult, or even impossible for human divers. Existing AUVs can be expensive, cumbersome, and inflexible in functionality. They can be hard to acquire, difficult to deploy, inadaptable for dynamic needs, and too complex for non-experts to operate and maintain. As a result, the use of AUVs for existing marine applications may be limited.

A conventional way to actuate an AUV includes the use of three individual thrusters for the vertical, starboard and port actuation, respectively.

SUMMARY

This document provides designs and techniques for fluid thrusters and vehicles that are powered by propelling fluids with fluid thrusters. A fluid can be a liquid such as water or a gas such as air. The designs and techniques described in this document can be used to construct various vehicles, including underwater vehicles that operate and move within a body of water or liquid and surface vehicles that operate and move on the surface of a body of water or liquid or on the ground. Such vehicles use reconfigurable connectors arranged around a thruster to provide reconfigurable thruster actions in multiple directions based on propelling a fluid (e.g., liquid or gas) flow in two opposite directions by the thruster. Multiplex-thruster (MT) systems are disclosed that include a single thruster and a flow multiplexer with multiple channels to deliver thrusting flow in various directions. The described vehicle designs and techniques can be implemented to make vehicles modular, multifunctional, and reconfigurable. The exemplary AUVs provided herein can include a power-efficient, reconfigurable, and lightweight actuation system, and modular components and architecture for dynamic reconfiguration. The actuation system can allow for efficient, flexible, precise, real-time, multi-dimensional actuation and can be applied to various underwater actuation needs, including omni-directional AUVs, high-precision real-time position control, and other demanding underwater applications. The modular components and architecture can allow for fast and easy reconfiguration and can ease the operation and maintenance and reduce the cost.

In one aspect, a multiplex-thruster (MT) system for delivering thrusting flow can include a thruster that has a first end and a second end and is configured to propel a fluid to flow in a first direction from the first end to the second end and in a second direction from the second end to the first end. The MT system can also include a first plurality of connectors in fluid communication with the first end of the thruster and a second plurality of connectors in fluid communication with the second end of the thruster. Each connector is configured to allow fluid flow through the connector when the connector is in an open state and to block fluid flow from the connector when the connector is in a closed state. The MT system is configured to thrust fluid flow from one or more of the first plurality of connectors to one or more of the second plurality of connectors or vice versa by setting the one or more of the first plurality of connectors and the one or more of the second plurality of connectors at an open state and all other connectors at a closed state and by controlling the thruster to propel fluid flow in either the first direction or the second direction.

In some embodiments, one or more of the connectors can include an adjustable valve to control the amount of fluid flown through said one or more connectors. In some embodiments, the MT system can also include first fluid conducting conduits that are respectively connected to the first plurality of connectors and second fluid conducting conduits that are respectively connected to the second plurality of connectors where the first and second fluid conducting conduits support fluid ports for receiving input fluid or output fluid in different directions with respect to one another.

In another aspect, an underwater vehicle can include a multiplex-thruster (MT) system for delivering thrusting. The MT system can include a thruster that has a first end and a second end and is configured to propel fluid flow in a direction from the first end to the second end and in a direction from the second end to the first end. The MT system can also include a first connector assembly that has three or more connectors and is in fluid communication with the first end of the thruster and a second connector assembly that has three or more connectors and is in fluid communication with the second end of the thruster. Each connector is configured to allow fluid flow through the connector when the connector is in an open state and to block fluid flow from the connector when the connector is in a closed state. The MT system is configured to thrust fluid flow from one or more connectors in the first connector assembly to one or more connectors in the second connector assembly or vice versa by setting the one or more connectors in the first connector assembly and the one or more connectors in the second connector assembly at an open state and all other connectors at a closed state and by controlling the thruster to propel fluid flow in a direction from the first end to the second end or vice versa. The underwater vehicle can also include a pair of vertical bi-directional channels that are configured to provide up-down movement for the vehicle and a pair of starboard bi-directional channels and a pair of port bi-directional channels that are configured to provide forward and backward movement for the vehicle when fluid flows through the pair of starboard channels and the pair of port channels in the same direction and to provide spinning movement for the vehicle when fluid flows through the pair of starboard channels and the pair of port channels in the opposite directions. One of the pair of vertical, starboard, or port channels is connected to one or more connectors in the first connector assembly and the other of the pair of vertical, starboard, or port channels is connected to one or more connectors in the second connector assembly. The pairs of vertical, starboard and port channels are connected to different connectors. The underwater vehicle can further include a thruster controller to control the thruster to control the fluid flow direction of the thruster and opening and closing of the connectors at the first and second connector assemblies to move the underwater vehicle up, down, forward, backward, spin-left, and spin-right by controlling the MT system to selectively control thrust fluid flow from the one or more connectors in the first connector assembly connected to said pair of vertical, starboard, or port channels to the one or more connectors in the second connector assembly connected to said pair of vertical, starboard, or port channels, or vice versa.

In some embodiments, one or more connectors can include an adjustable valve to control the amount of fluid flown through said one or more connectors. In some embodiments, at least one connector in each of the first and second assemblies can be used not to actuate the vehicle. In some embodiments, the underwater vehicle can also include one or more pairs of vertical, starboard, or port channels. In some embodiments, the underwater vehicle can also include a modularized architecture that has one or more battery modules, embedded computers, thruster controllers, underwater communication units, water samplers and sensor modules. In some embodiments, the one or more battery modules can include at least one smart battery. In some embodiments, the one or more sensor modules comprise at least one pressure sensor to measure and maintain the vehicle at a predetermined depth from water surface. In some embodiments, the one or more sensor modules can include at least one altimeter to measure and maintain the vehicle at a predetermined distance to water bottom. In some embodiments, the one or more underwater communication units can include a radio modem in communication with a wireless Ethernet at a remote station to allow for remote access and control of the vehicle. In some embodiments, the underwater vehicle can also include an electromagnet configured to allow the vehicle to stay mutually buoyant when the electromagnet is activated to hold a predetermined weight and to float the vehicle up to water surface when the electromagnet is deactivated to drop the predetermined weight. In some embodiments, the underwater vehicle can also include a sphere shell in which the MT system resides. In some embodiments, the underwater vehicle can have a turning radius of less than about 0.1 m. In some embodiments, the sphere of the underwater vehicle can be free-flooded to eliminate pressure difference in and out the vehicle.

In still another aspect, a device can include a multiplex-thruster that has a single thruster and a plurality of fluid valves. The thruster is configured to thrust fluid flow from one or more fluid valves to different one or more fluid valves. The device can also include a plurality of thrusting channels that are respectively connected to the fluid valves to direct fluid flow through one or more thrusting channels to different one or more thrusting channels to provide desired propelling to the device. The device can further include a thruster controller that is configured to control the thruster and the fluid valves to thrust fluid flow from one or more thrusting channels to different one or more thrusting channels to actuate the device to move.

In some embodiments, the device can be a surface vehicle. In some embodiments, the device can be an underwater vehicle. In some embodiments, the device can also include at least one pressure sensor to measure and maintain the device at a predetermined depth from water surface. In some embodiments, the device can also include at least one altimeter to measure and maintain the device at a predetermined distance to water bottom. In some embodiments, the device can also include an electromagnet configured to allow the device to stay mutually buoyant when the electromagnet is activated to hold a predetermined weight and to float the device up to water surface when the electromagnet is deactivated to drop the predetermined weight.

The above and other aspects and embodiments are described in greater detail in the drawings, the description and the claims.

DESCRIPTION OF DRAWINGS

FIG. 1: Multiplex Thruster (MT): (a) concept diagram; (b) an example implementation; and (c) applying the MT in (b) to a underwater vehicle.

FIG. 2: (a) the desired 3DOF for an underwater vehicle; and (b) the configuration of three thrustings to provide 3DOF for an underwater vehicle.

DETAILED DESCRIPTION

Examples of AUVs in this document use a thruster having a first end and a second end and configured to propel fluid flow in a direction from the first end to the second end and in a direction from the second end to the first end and arrange multiple first connectors or valves in fluid communication with the first end of the thruster and multiple second connectors or valves in fluid communication with the second end of the thruster. Each of the first and second connectors can be opened to allow the fluid flow and closed to block the fluid flow. The opening and closing of each connector can be individually controlled. The opening and closing of the first and second connectors and the two opposite flow directions provided by the thruster can be controlled to allow the fluid flow to enter one or more connectors and to exit one or more other connectors in various flow configurations. Hence, this combination of the first and second connectors and the thruster forms a reconfigurable multiplex thruster system using a single thruster. The various flow configurations of this reconfigurable multiplex thruster system can be channeled to propel the fluid flow in various configurations to provide multiple motions of an AUV utilizing such a reconfigurable multiplex thruster system. An AUV may be designed to use one or more such reconfigurable multiplex thruster system and the AUV examples provided below use a single reconfigurable multiplex thruster system. AUVs based on the present reconfigurable multiplex thruster system can be small, agile, easy to use and maintain, versatile for multiple functions, and adaptable and reconfigurable for different sensors and instruments in the field. The AUVs provided herein can be compact, inexpensive, and marine-approved systems that may integrate various technologies, such as intelligent robotic behaviors, autonomous navigation and control, modular and reusable hardware and software, reconfigurable components, embedded systems, advanced micro sensors, power technology, underwater communication and packaging techniques. The AUVs can include a underwater actuation system that has a Multiplex-Thruster which may enable the AUVs to have omni-directional movement and satisfy other demanding actuation needs without increasing the size, weight, power, and cost. The AUVs can also include a modular architecture that may enable and support the AUVs' components to reconfigure, exchange, and plug-and-play for versatile needs (such as multifunction or multi-sensory) as well as for easy deployment, operation, and maintenance in the field. The AUVs can have a wide range of applications in the industry for underwater actuation and systems, including oceanographic measurement, environmental monitor and protection, aquaculture, and offshore oilfields.

A Multiplex-Thruster (MT) system that can be used in the AUVs provided herein can include a single thruster and a flow multiplexer with multiple channels to deliver thrusting flow to wherever and whenever it is needed for generating torque for underwater vehicles. To compare the present MT system to some other thrusting systems used in various underwater or surface vehicles, an analogy of comparing two different electrical systems can be used. The present MT system is analogous to an electrical system in which there is one generator for the entire system and the electricity is delivered via wires and switches to where it is consumed. Some other thrusting systems are analogous to an electrical system in which there are many generators and every consuming device has its own generator. The present MT system can be economic, lightweight, and flexible, whereas some other thrusting systems can be expensive, heavy, and hard to change. As shown from this analogy, the present MT design can be implemented to consume low power and to be lightweight, flexible, and can be capable of dynamically controlling the thrust distribution, direction, and configuration at the run time. The present MT system may provide capabilities that go beyond the capabilities of many other thrust systems.

A Multiplex-Thruster can provide desired movement and spinning with much less weight and power consumption. The present MT design can be flexible, power efficient, and can be dynamically controlled for thrust direction, distribution and configuration, to achieve better performance, speed and accuracy.

Mechanically, a MT is a thruster plus a multiplexer with multiple channels whose states can be dynamically configured and controlled so that thrust can be directed to flow from some channels into some other channels. Each channel can have three possible states: input, output, and closed. An input channel allows current to flow into the MT; an output channel allows current to flow out from the MT; and a closed channel blocks any current flow. Multiple channels can be set into the same state. Both input and output channels must exist in order to use a MT as a thruster. The number of channels that a MT can have and the direction that a channel can direct the flow may be selected based on specific needs or requirements in a vehicle. Furthermore, the state of a channel can be a continuous value ranging from −1.0 to +1.0, with 0.0 representing the closed state, −1.0 representing the fluid input with a full opening, and +1.0 representing the flow output with a full opening. State values other than 0.0, −1.0 and +1.0 represent channels to be partially opened or closed for inputting or outputting the fluid so that the amount of flow can be precisely controlled to achieve a desired movement or maneuver.

Figure 1:
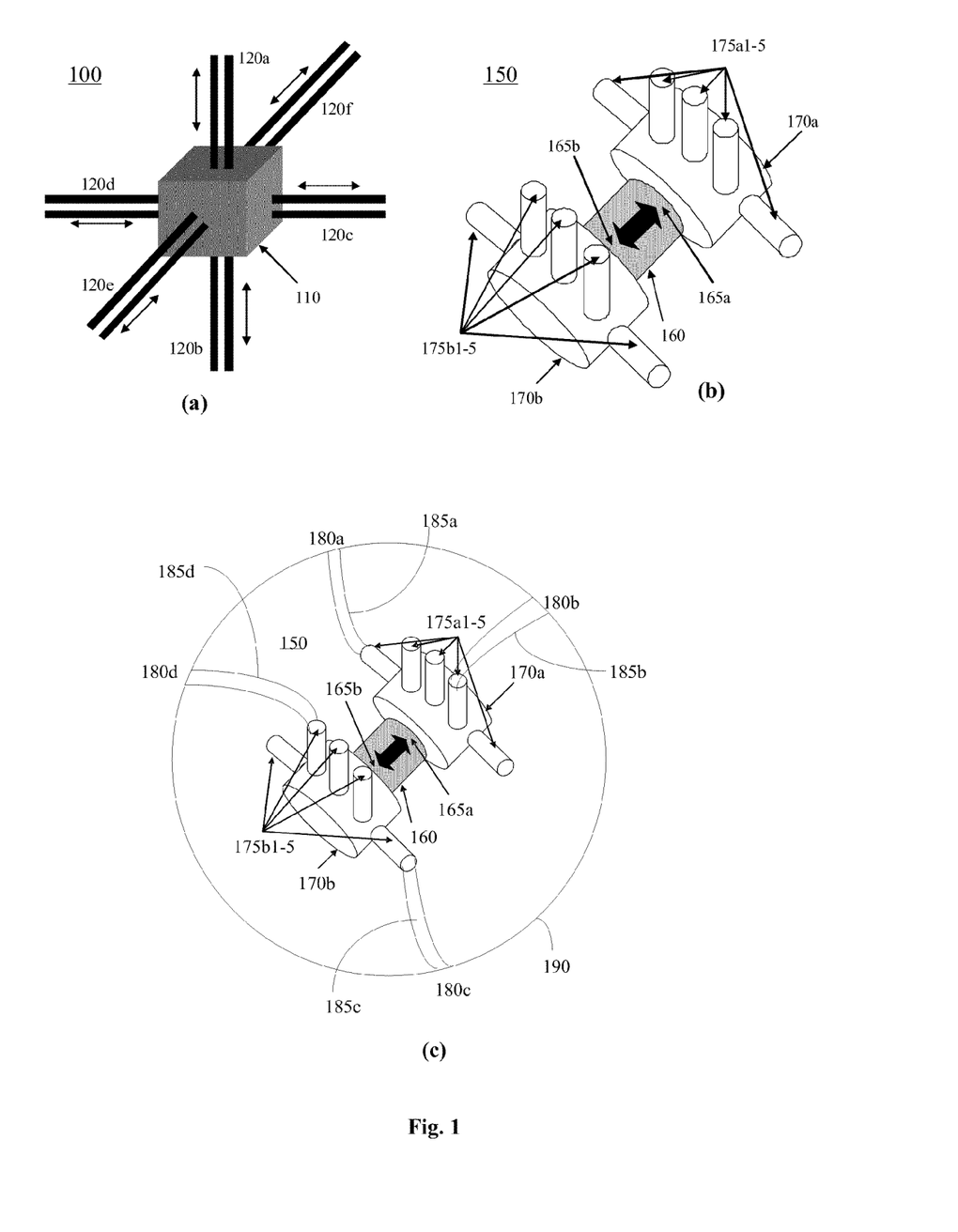

FIG. 1(*a*) shows a concept diagram for an example MT 100. The MT 100 has a thruster 110 and six bi-directional channels 120*a*-*f* that are connected to the thruster 110. Each channel 120*a*-*f* has three states of operation: input, output, and closed. When a channel 120*a*-*f* is set to be input, the thruster 110 can flow fluid into the MT 100 through that channel 120*a*-*f*; when a channel 120*a*-*f* is set to be output, the thruster 110 can flow fluid out of the MT 100 through that channel 120*a*-*f*; and when a channel 120*a*-*f* is set to be closed, no fluid can flow through that channel 120*a*-*f*. To illustrate how the MT 100 works, channels 120*a* and 120*f* are set to be input, channels 120*b* and 120*c* output, and channels 120*d* and 120*e* are closed. In this case, the thruster 110 can flow fluid from channels 120*a* and 120*f* to channels 120*b* and 120*c*. There are many other possible flow configurations for the MT 100. In general, a MT that has n channels can have $3^n$ different flow configurations. A single MT 100 can be used to drive a underwater vehicle in 3-dimensional movement. For example, the MT 100 can be enclosed inside the underwater vehicle where the six channels 120*a*-*f* of the MT 100 may be connected to thrusting ports or channels of the vehicle. For instance, channels 120*a* and 120*b* can be connected to the vertical thrusting port or channel of the vehicle so that the MT 100 can move the vehicle up or down by thrusting fluid flow from channel 120*a* to channel 120*b* or vice versa. Channels 120*c* and 120*d* can be connected to the longitudinal thrusting port or channel of the vehicle so that the MT 100 can move the vehicle left or right by thrusting fluid flow from channel 120*c* to channel 120*d* or vice versa. Channels 120*e* and 120*f* can be connected to the transverse thrusting port or channel so that the MT 100 can move the vehicle forward or backward by thrusting fluid flow from channel 120*e* to channel 120*f* or vice versa.

FIG. 1(*b*) shows an implementation of a MT 150. The MT 150 includes a single thruster 160 that has two ends 165*a*, 165*b*. The thruster 160 can propel fluid flow in a direction from thruster end 165*a* to thruster end 165*b* and in an opposite direction from thruster end 165*b* to thruster end 165*a*. One example of thrusters that may be used in a MT system is thruster SBT150A available from SeaBotix (San Diego, Calif.). This thruster can provide 2.9 kgf thrust for 80 W. Another example of thrusters that may be used in a MT system is IntegratedThrusters™ available from TSL Technology (Hampshire, England). These thrusters range from 50 mm propellers to 300 mm 250 kgf thrust workhorses. The MT 150 also includes two connector assemblies 170*a*, 170*b* that are in fluid communication with the thruster 160. Connector assembly 170*a* is connected to thruster end 165*a*, and connector assembly 170*b* is connected to thruster end 165*b*. Connector assembly 170*a* has one set of three or more connectors or valves 175*a*1-5, and connector assembly 170*b* has another set of three or more connectors valves 175*b*1-5. In FIG. 1(*b*), connectors 1-5 are numbered consecutively from left to right for each set of connectors. Each connector 175*a*1-5, 175*b*1-5 can be set to be open or closed. When a connector 175*a*1-5, 175*b*1-5 is set to be open, fluid can flow through that connector 175*a*1-5, 175*b*1-5; and when a connector 175*a*1-5, 175*b*1-5 is set to be closed, no fluid can flow through that connector 175*a*1-5, 175*b*1-5. By setting the connectors 175*a*1-5, 175*b*1-5 into different states, the MT 150 can thrust fluid flow from some connectors on one side of the thruster 160 to some connectors on the other side of the thruster 160. For example, if connectors 175*a*2 and 175*a*4 are set to be open, connectors 175*b*2 and 175*b*4 open, and the rest of the connectors 175*a*1, 175*a*3, 175*a*5, 175*b*1, 175*b*3, and 175*b*5 closed, the MT 150 can thrust fluid flow from connectors 175*a*2 and 175*a*4 to 175*b*2 and 175*b*4 by controlling the thruster 160 to propel fluid from thruster end 165*a* to thruster end 165*b*, or from connectors 175*b*2 and 175*b*4 to 175*a*2 and 175*a*4 by controlling the thruster 160 to propel fluid from thruster end 165*b* to thruster end 165*a*. The state selection of the connectors can be realized either by mechanical devices or electronic valves, such as the two-way solenoid valves available from KUHNWAY Corporation (Taipei, Taiwan), depending on the speed and force requirements.

FIG. 1(*c*) shows how a single MT 150 of FIG. 1(*b*) can provide various fluid flow configurations to achieve desired AUV movements. As shown in FIG. 1(*c*), the MT 150 can reside inside an AUV support shell or frame 190 that supports multiple thrusting ports and channels that are connected to respective connectors 175*a*1-5 and 175*b*1-5 at the two ends of the thruster 160. The support shell or frame 190 can also be used to mount other components or modules to the AUV, e.g., an AUV controller that controls the opening and closing of the connectors 175*a*1-5 and 175*b*1-5 and operations of the thruster 165. This AUV controller can be in wired or wireless communications with an external control device to carry out commands from the external control device. Selective fluid flow through one or more of the thrusting ports or channels allows for desired movement of the AUV. In general, the AUV can have as many thrusting ports or channels as needed for its desired movement. For example, the AUV can have one or more pairs of vertical thrusting ports or channels to provide up-down movement, and one or more pairs of port thrusting ports or channels and one or more pairs of starboard thrusting ports or channels to provide forward-backward movement when the port thrusting ports or channels and the starboard thrusting ports or channels run in the same direction and to provide spinning motion when the port thrusting ports or channels and the starboard thrusting ports or channels run in opposite directions. The AUV can also one or more pair of vertical thrusting ports or channels to provide up-down movement, one or more pairs of longitudinal thrusting ports or channels to provide left-right movement, and one or more pairs of transverse thrusting ports or channels to provide forward-backward movement. For purpose of illustration, only four thrusting ports or channels 180a-d are shown in FIG. 1(c). The thrusting ports or channels of the AUV can be so shaped, positioned and/or arranged as to provide the desired AUV movement. Each thrusting port or channel can be connected to one or more connectors of the MT by one or more fluid conducting conduits. In FIG. 1(c), thrusting ports or channels 180a-d are connected respectively to connectors 175a1, 175a4, 175b5, 175b2 by fluid conducting conduits 185a-d respectively. Some or all other connectors can also be connected to one or more thrusting ports or channels. By setting the connectors to different states, the MT 150 can selectively flow fluid from some thrusting ports or channels to some other thrusting ports or channels or vice versa so as to move the AUV in desired directions.

A multiplex thruster can have many applications. As an example, the 10-connector MT in FIG. 1(b) can be used to implement 3DOF actuation of a sphere-shaped vehicle. To do so, the thrusting arrangement of such a vehicle 200 can be viewed as a configuration of six bi-directional channels 210a-f shown in FIG. 2(a). Channels 210A and 210B are aligned with the vertical axis of the sphere with channel 210A positioned at north pole and 210B positioned at south pole. Channels 210A and 210B can provide vertical thrusting for the vehicle 200. Channels 210C and 210D are positioned at the port side of the sphere and perpendicular to the vertical axis of the sphere. Channels 210C and 210D provides port thrusting for the vehicle 200. Channels 210E and 210F are positioned at the starboard side of the sphere and perpendicular to the vertical axis of the sphere. Channels 210E and 210F provides starboard thrusting for the vehicle 200. FIG. 2(b) shows the configuration of vertical, port and starboard thrustings in a sphere can provide three degrees of freedom movement (up-down, forward-backward, and spin-left-right) for a sphere-shaped vehicle. Vertical thrusting 260 (i.e., thrusting along the vertical axis of the sphere) can provide up or down movement of vehicle 250 when thrusting flow is downward or upward. Port thrusting 262 (i.e., thrusting tangential to the port side of the sphere) and starboard thrusting 264 (i.e., thrusting tangential to the starboard side of the sphere) can provide forward-backward movement of vehicle 250 when both thrusting flow are backward or forward. Port thrusting 262 and starboard thrusting 264 can also provide spinning left-right when port thrusting flow is forward and starboard thrusting flow is backward or vice versa. With the ability to spin, a sphere-shaped underwater vehicle can have a turning radius of less than 0.1 meter. This is an advantage over the torpedo-shaped underwater vehicle.

Figure 2A:
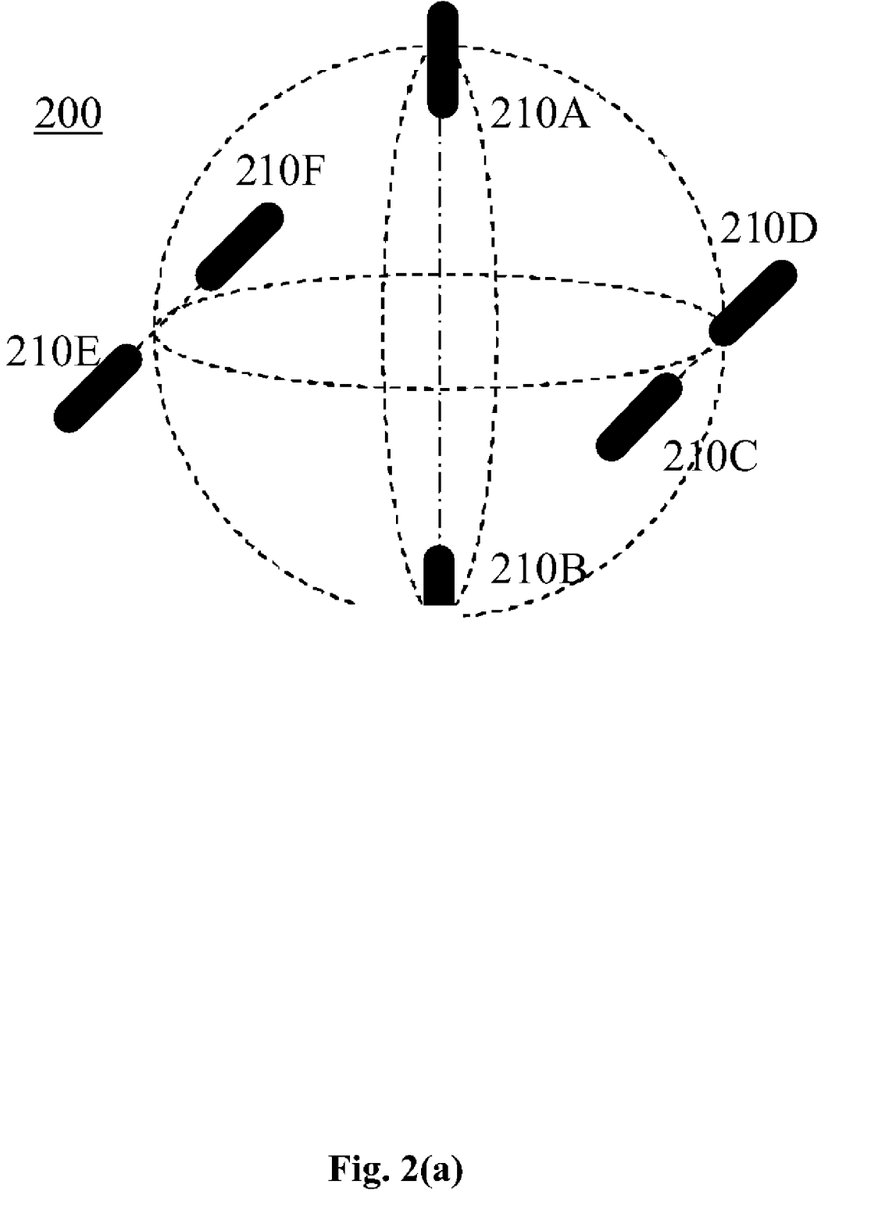
Figure 2B:
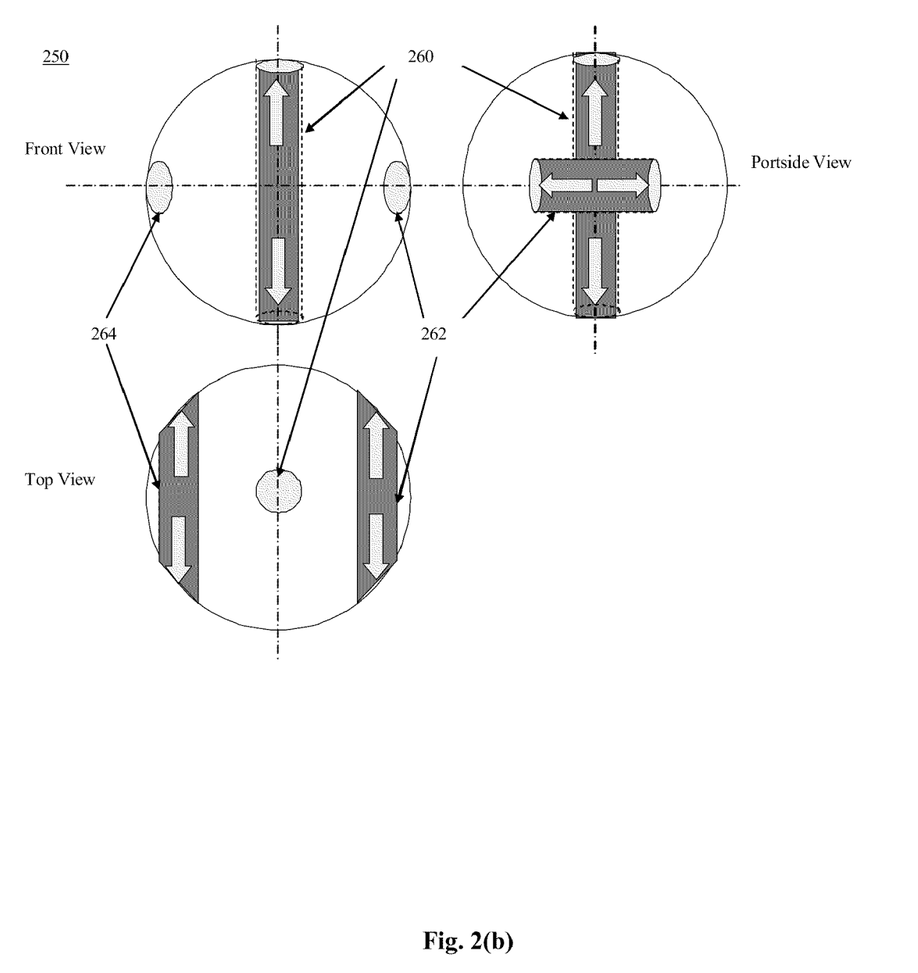

By setting the six channels 210a-f shown in FIG. 2(a) into different state combinations, the vehicle 200 can perform its desired 3DOF movements. For example, if channel 210A is set to be input and 210B is output (with all other channels 210C-F closed), then the vehicle 200 can move up. If channels 210D and 210F are inputs, and channels 210C and 210E are outputs (with all other channels 210A and 210B closed), then the vehicle 200 can move backward. If channels 210C and 210F are inputs, and channels 210D and 210E are outputs (with all other channels 210A and 210B closed), then the vehicle 200 can spin to the right. Table 1 lists the channel states that are necessary for the desired 3DOF movements for such a vehicle.

TABLE 1

The channel configuration table for FIG. 2(a) ("—" means closed).

| Desired Movement | Channel State | | | | | |
|---|---|---|---|---|---|---|
| | 210A | 210B | 210C | 210D | 210E | 210F |
| Backward | — | — | Output | Input | Output | Input |
| Forward | — | — | Input | Output | Input | Output |
| Spin-left | — | — | Output | Input | Input | Output |
| Spin-right | — | — | Input | Output | Output | Input |
| Up | Input | Output | — | — | — | — |
| Down | Output | Input | — | — | — | — |

The 10-connector MT 150 shown in FIG. 1(b) can be used to realize the above state table. For example, the six channels 210a-f in FIG. 2(a) can be connected to the connectors 175a1-5, 175a1-5 in FIG. 1(b) as follows:

| | Channel | | | | | |
|---|---|---|---|---|---|---|
| | 210A | 210B | 210C | 210D | 210E | 210F |
| Connector | 175a1 | 175b1 | 175b5 | 175a4 | 175a3, 175b3 | 175a2, 175b2 |

Figure 3A:
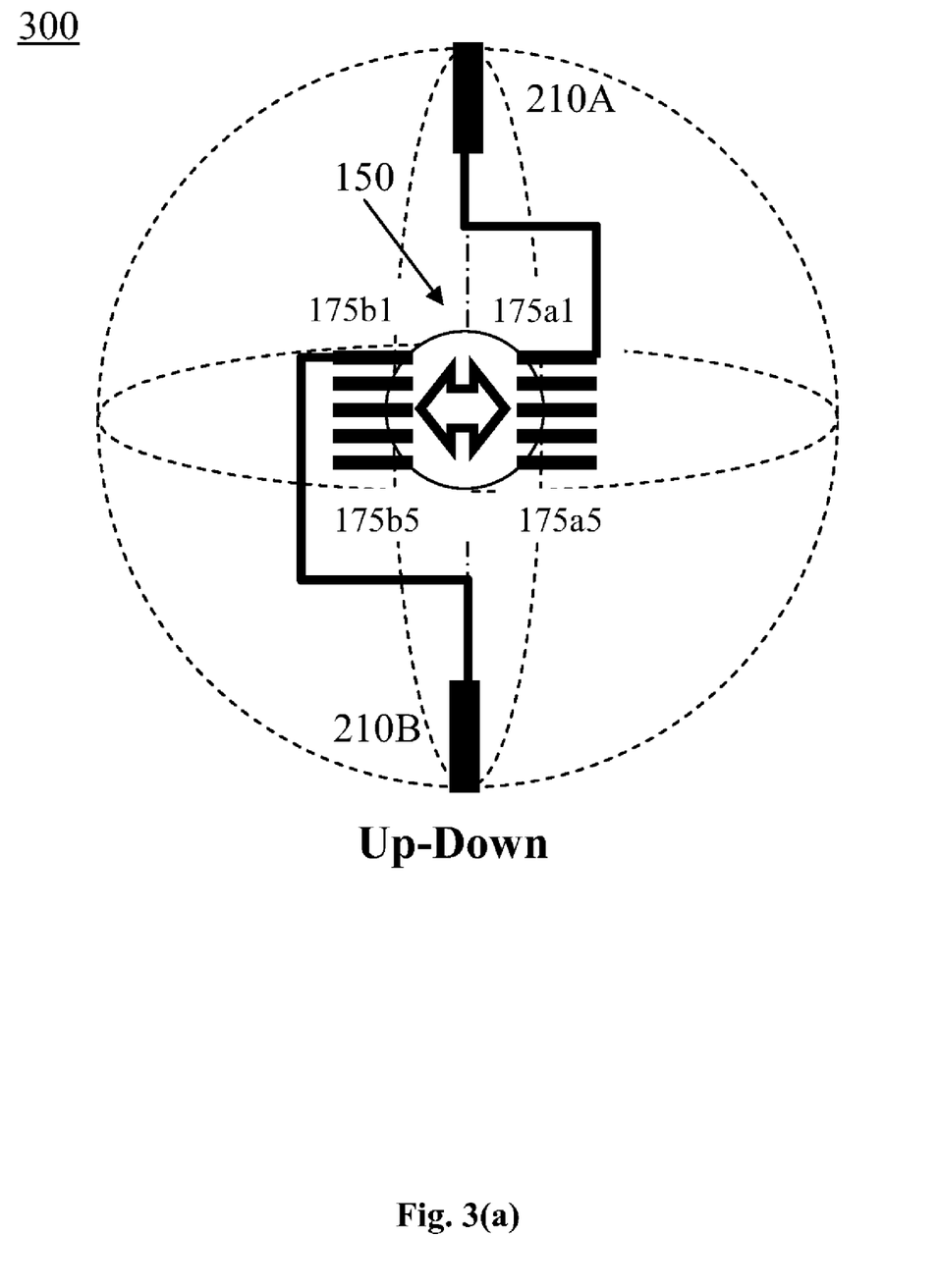
FIGS. 3(a)-(c): Applying the MT in FIG. 1(b) to the vehicle in FIG. 2(a).
Figure 3B:
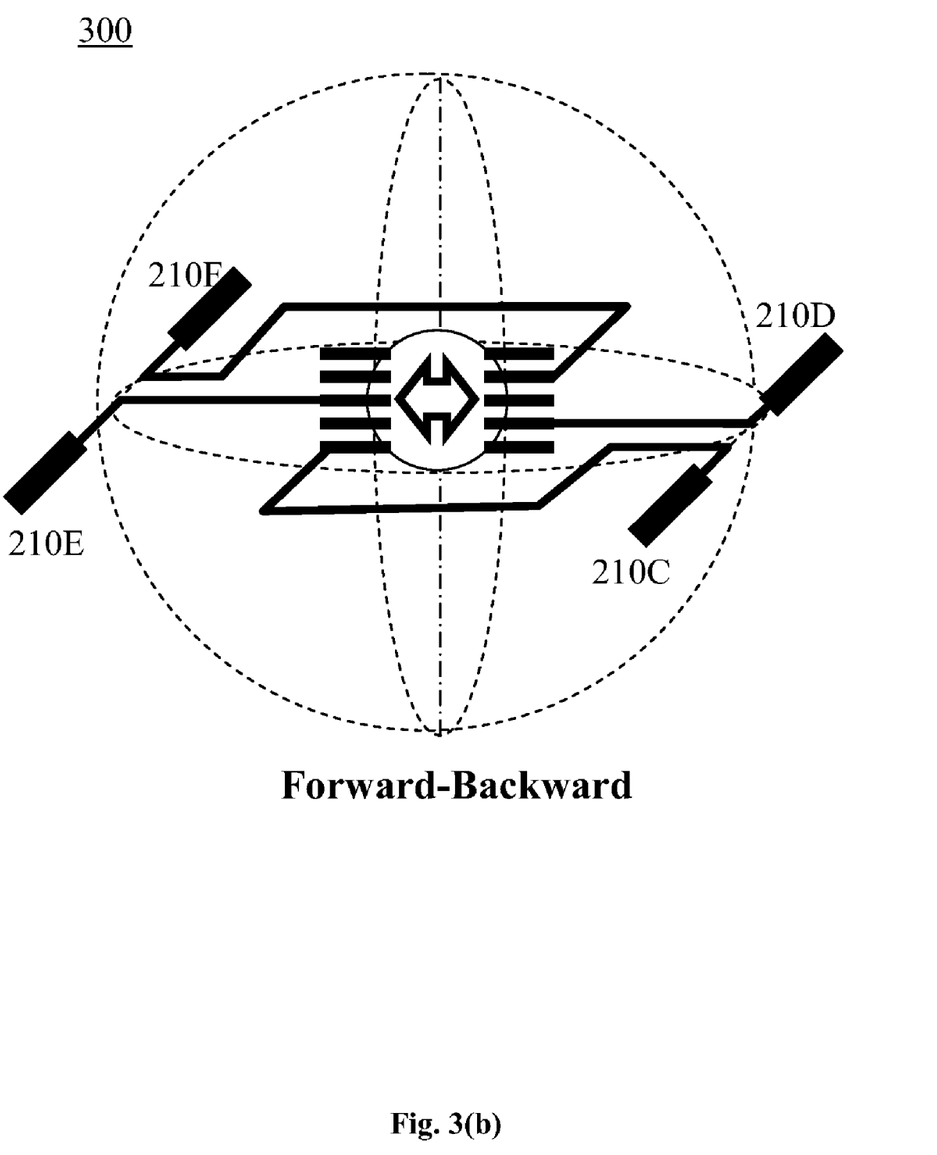
Figure 3C:
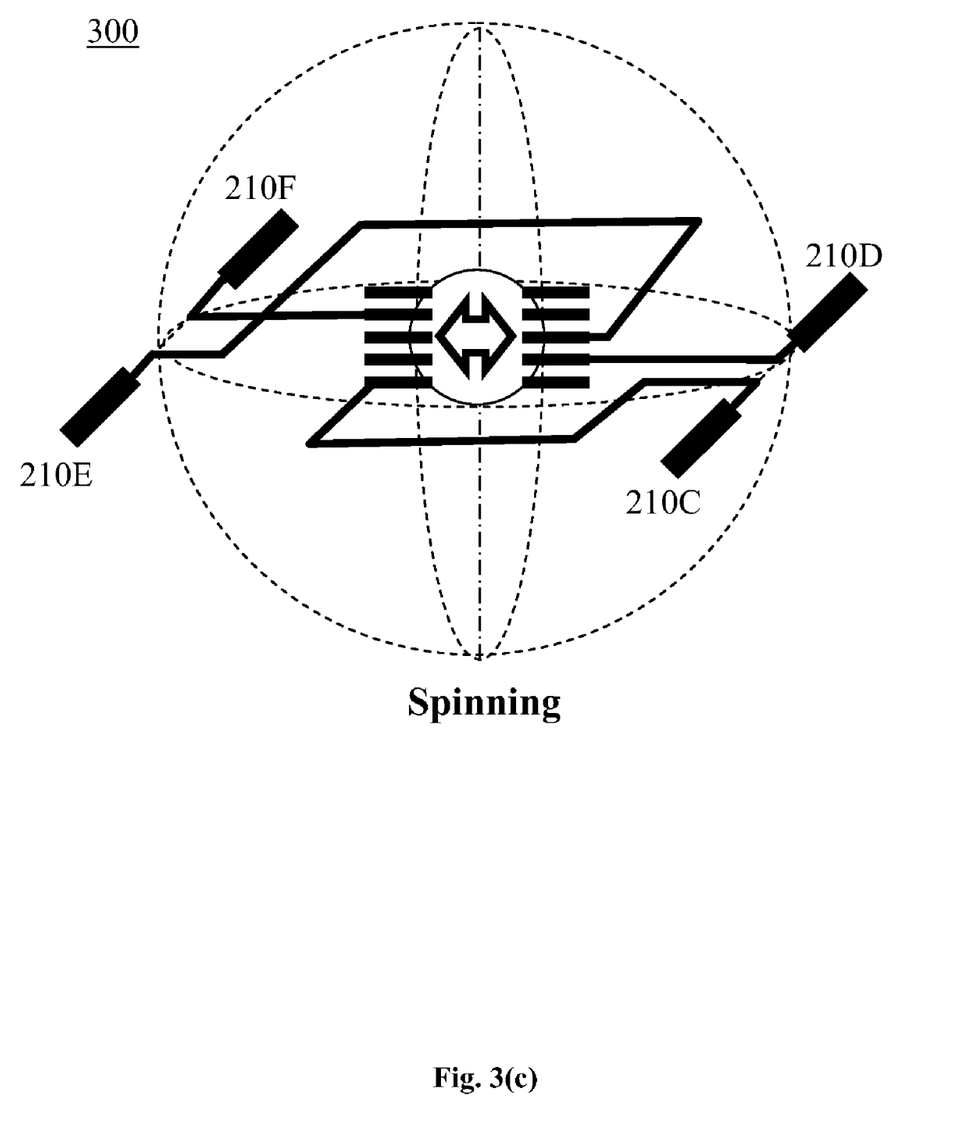

FIGS. 3(a)-(c) shows how the above connection works. Consider the following situations: If connectors 175a1 and 175b1 are open and all others 175a2-5, 175b2-5 are closed, then channels 210A and 210B will be connected (FIG. 3a), so the MT 150 can move the vehicle 300 up or down by thrusting fluid flow from connector 175a1 to connector 175b1 or vice versa. If connectors 175a2, 175b4, 175b3, 175b5 are open and all others 175a1, 175a3, 175a5, 175b1, 175b2, 175b4 are closed, then channels 210C and 210E will be on one side of the thruster and channels 210D and 210F on the other side (FIG. 3b), so the MT 150 can move the vehicle 300 forward or backward by thrusting fluid flow from connectors 175a2, 175a4 to connectors 175a3, 175b5 respectively or vice versa. If connector 175a3, 175a4, 175b2, 175b5 are open and all others 175a1, 175a2, 175a5, 175b1, 175b3, 175b4 are closed, then channels 210C and 210F will be on one side of the thruster and channels 210D and 210E on the other side (FIG. 3c), so the MT 150 can spin the vehicle 300 left or right by thrusting fluid flow from connectors 175b2, 175b5 to connectors 175a3, 175a4 respectively or vice versa.

The above example shows only one of many possible connections between the channels 210a-f and the connectors 175a1-5, 175b1-5. To illustrate, examples of other possible connections can include (1) 210A-175a1, 210B-175b1, 210C-175a2, 210D-175b2, 210E-175a3, 210F-175b3; (2) 210A-175a3, 210B-175b3, 210C-175a4, 210D-175b4, 210E-175a5, 210F-175b5; (3) 210A-175a1&175b1, 210B-

175*a*2&175*b*2, 210C-175*a*3&175*b*3, 210D-175*a*4&175*b*4, 210E-175*a*5, 210F-175*b*5; (4) 210A-175*a*1, 210-175*b*1, 210C-175*a*2&175*b*2, 210D-175*a*3&175*b*3, 210E-175*a*4, 210F-175*b*4; and many more. The above example only uses eight out of the ten connectors of the MT. This is to show that a single MT can be used for multiple purposes simultaneously. The unused connectors, 175*a*5 and 175*b*4, can be used for other purposes that may or may not be related to the actuation of vehicle. The above example also shows the possibility of real-time omni-directional control with high precisions. To do so, the number of channels in the vehicle can be increased to evenly distribute them in desired directions and a corresponding increase in the number of connectors in the MT if necessary. Adjustable valves can also be used to precisely control the amount of flow in each connector in the MT.

The present MT system can be used in various underwater vehicles or other devices that may require flexible, precise, and economic thruster systems that can be easy to control and capable of providing multiple degrees of freedom without utilizing a large number of separate thrusters. Such underwater vehicles can be small, agile and less power-consuming.

Figure 4:
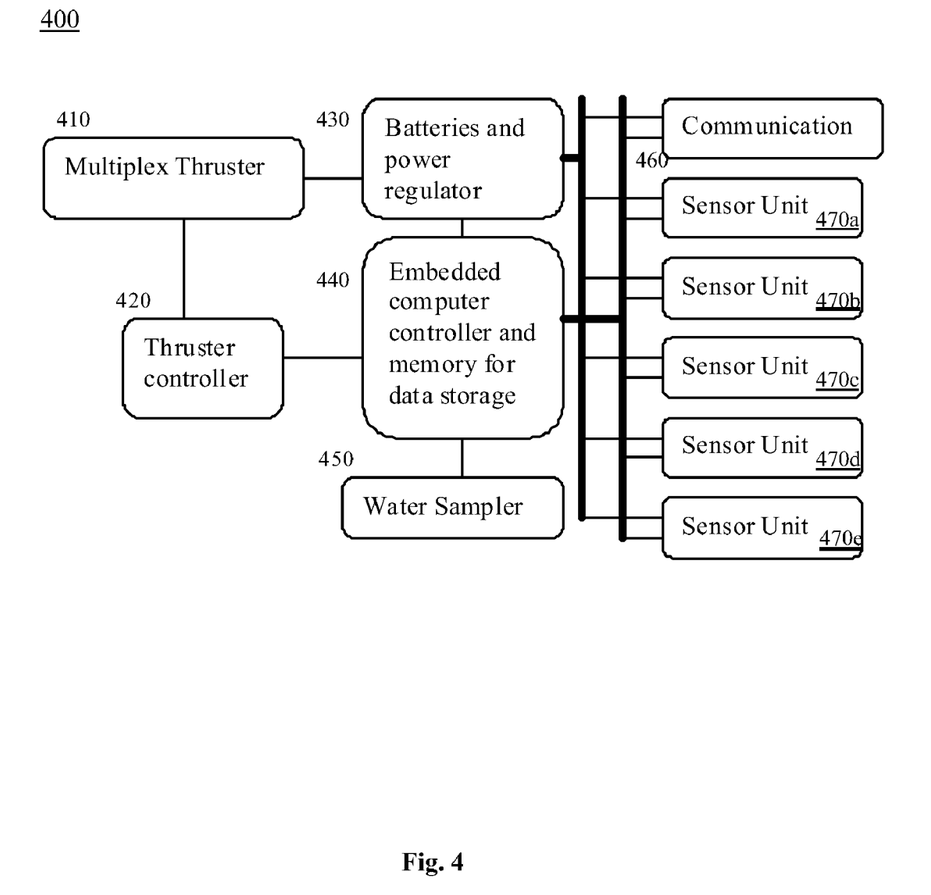
FIG. 4: An example of modularized system architecture for an AUV.

An example of a modularized system architecture that can be used in the AUVs provided herein is shown in FIG. 4. The system architecture 400 can include modularized components (or modules) that provide subsystem functions and that can be easily exchanged or replaced. The modules can include one multiplex thruster 410, one thruster controller 420, one battery package 430, one embedded computer 440, one water sampler 450, one underwater communication unit 460, and five sensor modules 470*a*-*e* that can host different types of sensors. The modules can be easily exchanged for fresh modules. This may reduce the in-field maintenance time and increase the versatility of AUVs for multifunctional usage.

In some embodiments, the battery package 430 of the AUVs provided herein can include smart batteries for high-performance power supply. An example of such batteries is N12040HD24 Smart Li Ion Battery available from Inspired Energy Corporation (Newberry, Fla.). A N12040HD24 battery is 10.8V and 7.2 Ahr. In some embodiments, the AUVs can use 12 such batteries (6 parallel of 2 serial) to make a package of 21V and 28.8 Ahr. Such a package can be more than sufficient for up to 10 hours of continuous operation in open water.

In some embodiments, the sensor modules 470*a*-*e* of the AUVs provided herein can host up to five different types of sensors as shown in the system diagram in FIG. 4. Each sensor module 470*a*-*e* can host a different type of sensor at different time. Sensors suitable for use in the AUVs can include depth, altimeter, camera, chlorophyll, dissolved oxygen, CTD, pH, light, turbidity, photosynthetic active radiation (PAR), and more.

In some embodiments, the AUVs can use a pressure sensor to autonomously measure and maintain a fixed depth from the surface. An example of suitable pressure sensors is the FM60 pressure sensor available from BTS Fluid Measurement (England). The FM60 sensor has a standard USB interface so that the sensor can be plugged into a PC USB port or hub.

In some embodiments, the AUVs can use an altimeter to autonomously measure and maintain a fixed distance to the sea bottom. An example of suitable altimeters is Tritech PA500 Bathy Altimeter available from Ashtead Technology Rentals. The PA500 altimeter is accurate and has a standard RS232 interface. The altimeter can be mounted at the bottom of the AUVs. An altimeter, together with a depth sensor, may provide sufficient measurements for the AUVs to autonomously undulate near the bottom and near the surface, where much of the biological activity is taking place.

In some embodiments, the AUVs can use other environmental sensors for data acquisition. For example, the AUVs can use a sensor to measure conductivity, temperature, and pressure. An example of such sensors is the Micro-3 CTD sensor available from Applied Microsystems (Sidney, B.C. Canada). The Micro-3 package has RS-232 logging capability and can integrate with up to six other sensors such as pH, dissolved oxygen, turbidity, and chlorophyll.

In some embodiments, the water sampler 450 of the AUVs provided herein can be used for autonomous water sampling. An example of suitable water samplers is the Carousel water sampler SBE 32 available from Sea-Bird Electronics (Bellevue, Wash.) or a similar device with a smaller size. The SBE water sampler includes a bottle with an electric valve that can be controlled by the embedded computer inside the AUV system.

In some embodiments, the underwater wireless communication and remote control unit 460 of the AUVs provided herein can include a WHOI micro-modem to communicate with an underwater transducer that is attached to a floating surface station such as a boat or a buoy. An example of suitable micro-modems is TMS320C5416 DSP available from Texas Instruments (Dallas, Tex.). The TMS320C5416 DSP modem has a transmit power of 10 W that can match to single omni-directional ceramic transducer, and a receive power of 80 mW, while detecting or decoding a low-rate FSK packet. The TMS320C5416 DSP modem has a communication data rate of 80-5400 bps. The micro-modem can be installed inside the AUVs and connected to the computer in the AUVs. The corresponding transducer attached to the surface station can be connected to a portable computer operated by a human operator.

When the AUVs are on or near the surface, the AUVs can communicate with the base station with a long-range radio modem and a short-range wireless Ethernet. In some embodiments, the radio modem can be Hydralink ML available from Ocean Science (Oceanside, Calif.). In some embodiments, the wireless Ethernet can be Aironet 350 PCMCIA available from Cisco (San Jose, Calif.). Together, the radio modem and wireless Ethernet can enable the AUVs to be remotely accessed for control, programming, testing, tracking, and data downloading.

In some embodiments, the AUVs provided herein can have the capability of automatically resurfacing themselves in case of unexpected fault or emergency so that they can be retrieved easily. For this capability, the AUVs can use an electromagnet to hold up a small weight that makes the total system mutually buoyant in seawater. Under normal circumstances, the electromagnet can be constantly activated under the supervision of a watchdog timer inside the control computer of the AUVs, so the AUVs stay mutually buoyant. In case of emergency when the computer is dead or stalled, the watchdog can time out and deactivate the electromagnet. This may cause the AUVs to drop the attached weight and become positively buoyant, thus float up to the surface. Once on the surface of the water, the AUVs can activate its radio modem (e.g., Hydralink ML) to emit a radio beacon so that the AUVs can be located and retrieved within a range of a certain radius (e.g., 20 miles).

In some embodiments, the controller 420 of the AUVs provided herein can be used to control the operation of the multiplex-thruster 410. In some implementations, the AUVs can use a Pololu 30-Amp motor driver board available from Pololu Robotics and Electronics (Las Vegas, Nev.) with an Atmega128 microcontroller available from Atmel (San Jose, Calif.) as a compact solution to control the MT. The Pololu driver board uses the VNH3SP30 motor driver integrated circuit available from STMicroelectronics (Geneva, Switzerland) and incorporates various components for typical applications, including pull-up and current-limiting resistors and a FET for reverse battery protection. Software can be developed for the motor controller using Atmega128 and feedback can be added to this controller.

In some embodiments, the embedded computer 440 of the AUVs provided herein can be used as the on-board controller for programming and executing autonomous behaviors, data acquisition and storage, communication, and interface with human operator. In some implementations, the AUVs can use JRex-PM embedded 3.5" SBC single-board computer available from Diamond Point International (England). The JRex-PM embedded computer includes 10/100 Base-T Ethernet, CRT&LCD support via JILI, Standard PC I/O, one RS232, and two USB2. The embedded computer can be stacked with many other extension boards for more I/O ports and more communication capability. Two useful add-on boards are JFLEX-SERIALGPIO1 and JFLEX-Communication1. The first board enables MultiCOM-communication, GPIO or CAN-Bus driven applications, and provides more interfaces of 3xRS232 (or 3xTTL) and 1xRS422/485. The second board includes 3xLAN, 4xUSB, and Firewire.

In some embodiments, the AUVs provided herein can include an underwater color camera for navigation and data acquisition. Such an underwater vision system may allow for autonomous behaviors. For example, the AUVs can autonomously follow a diver who wears a red vest. The AUVs can autonomously track the red color underwater and change their movements to follow the diver.

In the AUVs provided herein, all the mechanical and electronics hardware described above can be integrated into a single system.

In some embodiments, the AUVs provided herein can have a sphere shell in which all modules of the modular system architecture and the multiplex-thruster reside. The sphere can be free-flooded to eliminate the pressure difference in and out the AUVs for maximum depth and easy in-field servicing and maintenance. This can maximize the payload volume without increasing the system's overall weight. The AUVs can be mutually buoyant in ocean water and the center of mass can be kept low near the bottom of the sphere so that the AUVs can be balanced to keep the upright position along the vertical axis. The sphere shape can prevent the AUVs from tangling with underwater plants and other materials. The sphere can also provide open hatches for maintenance.

In some implementations, the AUVs provided herein can be constructed as sphere-shaped AUVs that may have a diameter of less than 1 meter, a total weight of no greater than 15 kg, and a turning radius of less than 0.1 meter. The AUVs can maintain, change, or undulate its depth autonomously or under remote control; host five types of sensor; run for 4 to 10 hours without changing batteries; and sample water when a sensor of choice detects an abnormal signal. All components can be exchangeable and replaceable for easy maintenance and reconfiguration in the filed.

In some embodiments, the AUVs provided herein can have programs for data acquisition in field, user-friendly interfaces for downloading software and data, and MATLAB for 3D data visualization and statistical analysis with user-specified parameters and thresholds. All software for autonomous behaviors, remote control, sensing, logging, and analysis can be modularized so that they can be easily rebooted, replaced, or updated. Software for emergency recovery can be developed.

In some implementations, the real-time software for the AUVs' autonomous can include actuator drivers including driver for actuating the thruster and driver for sampling water; sensor drivers including driver for reading current value from a sensor; data logging including programs that start and stop continuous data acquisition from a sensor and store the data acquired in a file; low-level vehicle controller implementation including programs that control AUVs' 3ODF movements; higher-level controller management or autonomous behaviors; mission level control; and fault and emergency management.

In some implementations, the real-time software for the AUVs' autonomous behaviors can include a program that moves the AUVs to the depth and maintain the AUVs at that depth for a duration using the feedback from a depth sensor. The software can also include a program that moves the AUVs to an altitude from the bottom and maintain the AUVs at that altitude for a duration using the feedback from an altimeter.

In some implementations, the real-time autonomous behaviors can run in parallel and be composed into more complex, mission-level behaviors. For example, consider a behavior that undulates the AUVs between near surface and near bottom for every 30 minutes until 5 PM, and then moves the AUVs to the surface and wait for pick up. When this undulating behavior is running, the AUVs may also execute in parallel other sensor behaviors. For instance, one behavior can be to measure dissolved oxygen near the surface, another behavior can be to measure CTD near the bottom, and a third behavior can be to sample water when pH is higher than a threshold. The measured data can be stored in separate files, and they can be displayed and analyzed later by other on-board software, or downloaded to a remote computer for analysis. The sensor behaviors can be continuous for the entire mission, while the water sampling can be done only once. This shows the diversity of possible behaviors.

In some implementations, the software for fault and emergency management can be another high-level behavior. This behavior can activate the electromagnet for the attached weight when a waterdog timer is not expired. Under normal circumstances, the watchdog can be periodically renewed by the computer when it is alive. In case of emergency, the waterdog would not be renewed and the emergency behavior can eventually deactivate the electromagnet to drop the attached weight, causing the AUVs to float up to the surface.

In some implementations, software for communication with the remote control station can be an interrupt-driven behavior. This behavior can wake up every time there is a command received by the radio or the acoustic modem and can execute the received command immediately. A remote command can be a name of a behavior, such as forward, back, left, right, up, down, StayDepth, or StayAltitude. A remote command can have a priority that is higher than any of the autonomous behaviors and this can ensure the immediate response of the AUVs and provide a mechanism for an adjustable autonomy. Using this mechanism, the AUVs can be remotely controlled for supervised behaviors. For example, the AUVs can be remotely controlled to go to a target area, before they start their own autonomous behaviors.

In some implementations, software for remote programming can be the set of standard protocols such as "telnet," "rlogin," "xterm," or others. These remote protocols may allow a remote operator to login on the computer inside the AUVs and perform remote operations such as creating or editing programs, compiling programs, starting/stopping behaviors, or downloading data. A remote operator can also visualize the data without downloading in a X window environment. In some implementations, the COTS software MATLAB can be used as the main tool for data visualization and data analysis.

In some implementations, software for operator interface can be developed for the remote control station. This software may allow the operator to query the AUVs' current status and sensor reading, as well as send commands to the AUVs to control their behaviors. The status information can include the depth, altitude, voltage of batteries, and status of each thruster or MT channels. The remote commands can include the AUVs' behaviors described above.

All the components of the AUVs described above can be economically modularized to perform plug-and-play and achieve reconfiguration, multifunction, easy maintenance, and low cost.

In various implementations, the AUVs provided herein can maintain a fixed depth near surface or a fixed altitude near bottom for, e.g., 4 to 10 hours; undulate near surface and near bottom for a fixed frequency for, e.g., 4 to 10 hours; acquire data continuously and simultaneously on one, two, or three sensors for, e.g., 4 hours; sample water when triggered by a sensor or a clock; remote control underwater behaviors (e.g., go to a target area in 3D space) from a laptop; remote program a simple behavior when the AUVs are on or near surface; remote download data and perform 3D visualization and statistical analysis; and recover from an emergency (e.g., power lost or system crash) by automatic resurfacing.

The AUVs provided herein can have a precision hovering ability and can be dynamically reconfigured to integrate with multiple underwater sensors and can be easy to deploy, operate, maintain, and adapt to a variety of underwater applications for environmental monitor and protection, offshore oil industry, aquaculture, and other ocean resource exploration and utilization. For example, the AUVs can be used for offshore oil platform inspection if an underwater color camera is integrated for visual inspection and detecting problem situations in time. The AUVs can also be used for offshore aquaculture as the AUVs' reconfigurability can provide an economic solution to the need for frequent underwater operations with different sensors, manipulators, and actuators. The AUVs can further be used for underwater inspection at seaports for security since the AUVs can be easily tailored to perform periodic patrol and inspect some critical underwater structures in the port, as well as the incoming ships below the waterline. The AUVs can additionally be used for ship cleaning because the AUVs can be attached to a small cleaning device and perform the ship cleaning service for both government and private agencies.

This document provides various examples of AUVs where the multiplex thruster and modular architecture described herein can be utilized. Such multiplex thruster and modular architecture can also be utilized in other types of vehicles or devices including surface vehicles.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub combination or a variation of a subcombination.

The invention claimed is:

1. An underwater vehicle, comprising:
a multiplex-thruster (MT) system for delivering thrusting flow comprising:
a thruster having a first end and a second end and configured to propel fluid flow in a direction from the first end to the second end and in a direction from the second end to the first end; and
a first connector assembly having three or more connectors and in fluid communication with the first end of the thruster and a second connector assembly having three or more connectors and in fluid communication with the second end of the thruster, each connector being configured to allow fluid flow through the connector when the connector is in an open state and to block fluid flow from the connector when the connector is in a closed state;
wherein the MT system is configured to thrust fluid flow from one or more connectors in the first connector assembly to one or more connectors in the second connector assembly or vice versa by setting the one or more connectors in the first connector assembly and the one or more connectors in the second connector assembly at an open state and all other connectors at a closed state and by controlling the thruster to propel fluid flow in a direction from the first end to
the second end or vice versa;
a pair of vertical bi-directional channels configured to provide up-down movement for the vehicle, and a pair of starboard bi-directional channels and a pair of port bi-directional channels configured to provide forward and backward movement for the vehicle when fluid flows through said pair of starboard channels and said pair of port channels in the same direction and to provide spinning movement for the vehicle when fluid flows through said pair of starboard channels and said pair of port channels in the opposite directions; wherein one of said pair of vertical, starboard, or port channels is connected to one or more connectors in the first connector assembly and the other of said pair of vertical, starboard, or port channels is connected to one or more connectors in the second connector assembly, wherein said pairs of vertical, starboard and port channels are connected to different connectors; and
a thruster controller to control the thruster to control the fluid flow direction of the thruster and opening and closing of the connectors at the first and second connector assemblies to move the underwater vehicle up, down, forward, backward, spin-left, and spin-right by controlling the MT system to selectively control thrust fluid flow from the one or more connectors in the first connector assembly connected to said pair of vertical, starboard, or port channels to the one or more connectors in the second connector assembly connected to said pair of vertical, starboard, or port channels, or vice versa.

2. The underwater vehicle of claim 1, wherein one or more connectors comprise an adjustable valve to control the amount of fluid flown through said one or more connectors.

3. The underwater vehicle of claim 1, wherein at least one connector in each of the first and second assemblies is used not to actuate the vehicle.

4. The underwater vehicle of claim 1, further comprising one or more pairs of vertical, starboard, or port channels.

5. The underwater vehicle of claim 1, further comprising a modularized architecture having one or more battery modules, embedded computers, thruster controllers, underwater communication units, water samplers and sensor modules.

6. The underwater vehicle of claim 5, wherein the one or more battery modules comprise at least one smart battery.

7. The underwater vehicle of claim 5, wherein the one or more sensor modules comprise at least one pressure sensor to measure and maintain the vehicle at a predetermined depth from water surface.

8. The underwater vehicle of claim 5, wherein the one or more sensor modules comprise at least one altimeter to measure and maintain the vehicle at a predetermined distance to water bottom.

9. The underwater vehicle of claim 5, wherein the one or more underwater communication units comprise a radio modem in communication with a wireless Ethernet at a remote station to allow for remote access and control of the vehicle.

10. The underwater vehicle of claim 1, further comprising an electromagnet configured to allow the vehicle to stay mutually buoyant when the electromagnet is activated to hold a predetermined weight and to float the vehicle up to water surface when the electromagnet is deactivated to drop the predetermined weight.

11. The underwater vehicle of claim 1, further comprising a sphere shell in which the MT system resides.

12. The underwater vehicle of claim 11, wherein the vehicle has a turning radius of less than about 0.1 m.

13. The underwater vehicle of claim 11, wherein the sphere is free-flooded to eliminate pressure difference in and out the vehicle.

* * * * *